Nov. 30, 1954
D. SPOONER
2,695,463
VISUAL TEACHING AID
Filed Aug. 8, 1952
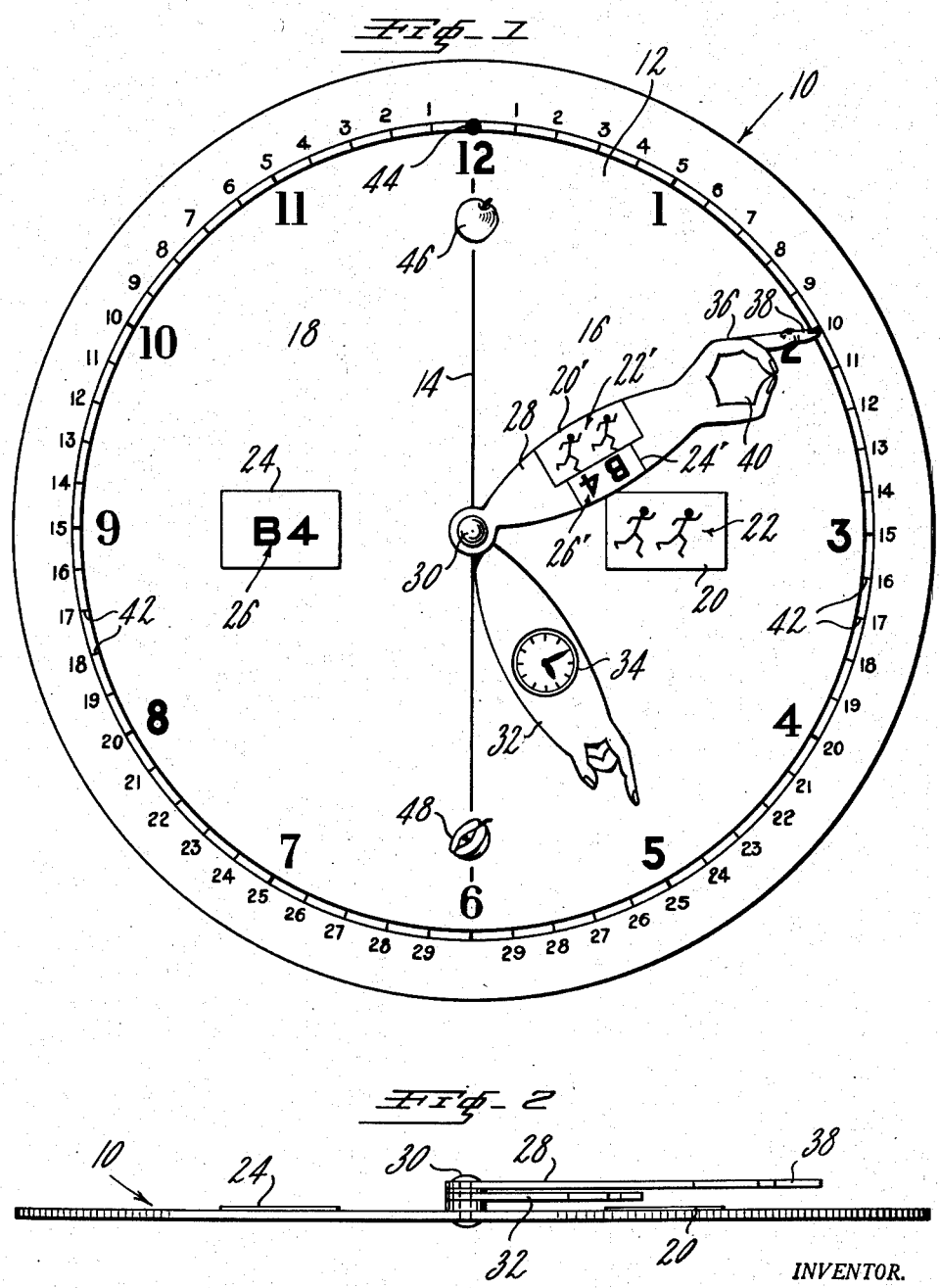
INVENTOR.
DANIEL SPOONER
BY Morton Amster
ATTORNEY

United States Patent Office 2,695,463
Patented Nov. 30, 1954

2,695,463

VISUAL TEACHING AID

Daniel Spooner, Long Beach, N. Y.

Application August 8, 1952, Serial No. 303,222

5 Claims. (Cl. 35—39)

The present invention relates to educational devices, and more particularly to a visual aid for teaching children to tell time.

In attempting to teach relatively young children to tell time, conventional educational devices exhibit shortcomings traceable to the inherent limitations of the unschooled and untrained mind of the average child. However, even before any formalized education, most children can count and have the capacity to associate rather simple symbols with words or phrases.

Accordingly, it is an object of the present invention to provide a visual time-teaching aid which takes advantage of the capacities of the average child prior to formal training. In particular, an object of the present invention is the provision of an educational device which pictorially represents or interprets the fundamental mental operations involved in telling time by symbols or indicia readily distinguished and easily associated by a young child.

The above and still further objects of the present invention will be best understood by reference to the following description of an illustrative embodiment when taken in conjunction with the drawing.

Fig. 1 is a plan view of a visual time-telling aid embodying features of the present invention; and Fig. 2 is an elevational view of the time-telling aid of Fig. 1.

Referring now to the drawing there is shown a teaching aid which advantageously pictorially relates the essential mental steps involved in the telling of time to relatively simple symbols. Specifically, a circular member 10 is provided with a clock face 12 thereon provided with numerals from 1 to 12 at spaced peripheral locations indicative of the hours of the day.

A dividing line 14 extends across the clock face 12 from the numeral 12 to the numeral 6 and subdivides the clock face into a right hand segment 16 separated from a left hand segment 18. The right hand segment 16 is provided with an identifying member 20 indicating the right hand segment to be the "after" side of the clock face. In the illustrative embodiment the indicating member 20 is provided with a pictorial representation 22 of one child chasing another child which is suggestive to the adolescent being taught of the term "after"; that is to say, one child in pursuit of or "after" the other child. The left hand segment 18 is provided with a member 24 indicating the left hand segment 18 to be the "before" side of the clock face. In this instant, the pictorial representation takes the form of the symbol B-4, designated by the numeral 26. Since most children of preschool age are familiar with the alphabet and with numbers, this symbol readily suggests to the child the word "before."

An elongated member 28 is constructed to simulate a human hand and is pivoted adjacent one end on a pin 30 for movement about the clock face 12 to traverse the right and left hand segments 16 and 18, respectively. The elongated member 28 is to be the "before or after" hand and is provided with an identifying member 20' having symbols 22' corresponding to the identifying member and symbol 20, 22 on the right hand segment 16. The identifying member 20' and symbols 22' are uppermost and properly discernable only when the "before or after" member 28 traverses the right hand segment 16. Another identifying member 24' including the symbols 26' is provided on the "before or after" member 28 and is similar to the identifying member and symbol 24, 26 on the left hand segment 18. The identifying member 24' and symbols 26' are uppermost and properly discernible only when the "before or after" member 28 traverses the left hand segment 18. Accordingly, as the "before or after" member is selectively positioned, overlying either the right hand or left hand segment of the clock face 12, the appropriate indicia or pictorial representation on the "before or after" hand will be observed by the child and readily associated with the corresponding segment of the clock face. In other words, when the "before or after" hand is between the hour and half past the hour; that is, when it is overlying the right hand segment 16 with the "after" indicia 20', 22' uppermost, the child will associate that the time is "after." Similarly the child will ascertain that the time is "before" when the "before or after" hand is between the numerals 6 and 12, that is, when it is overlying the left hand segment 18 with the "before" indicia 24', 26' uppermost.

Another elongated member 32 shaped to simulate a human hand and of a length shorter than the "before or after" member 28 is pivoted adjacent one of its ends on the pin 30. The elongated member 32 is provided with an identifying part or member 34 which is a pictorial representation of the face of a clock. Accordingly, the child will be taught that this is the "o'clock" hand and any number pointed to by the "o'clock" hand is an "o'clock" number.

The extremity 36 of the "before or after" member 28, in the form of a human hand, is arranged with the index finger and thumb defining a circular opening 40. The middle, ring and pinky fingers are positioned to provide an arrow or pointer 38 adapted to extend toward the particular number or marker immediately adjacent the "before" or "after" hand to indicate that the time is a certain number of units "after" as the member 28 traverses the right hand segment 16 and that the time is a certain number of units "before" as the member 28 traverses the left hand segment 18. In order to facilitate the counting of the units "before" or "after," that is, the minutes, markers in the form of lines 42 are provided at spaced peripheral locations of the clock face 12.

The markers 42 on the right hand or "after" segment 16 are successively provided with the numbers 1 to 29 reading clockwise from the numeral 12 to 6. Conversely the markers 42 on the left hand or "before" segment 18 are successively provided with the numbers 1 to 29 reading counterclockwise from the numerals 12 to 6. It is to be noted that the marker opposite the numeral 12 is in the form of a starting point or circle 44 to differentiate the same from the markers 42 since the marker 44 should not be counted when ascertaining the units or minutes "before" or "after" the hour.

Contiguous and below the numeral 12 there is provided a pictorial representation 46 suggestive of "the whole hour." In the illustrative example, which has been found to be successful in actual use of the teaching aid, a "whole" apple is provided as symbolic of the hour; whereas, a similar pictorial representation 48, namely, "half" an apple is symbolically suggestive of half of the whole or, in this case, half of the hour. Accordingly, as the "before or after" hand traverses the clock face 12 and reaches the point where it extends toward the numeral 6, the pictorial representative 48, suggestive of a half, will be framed within the opening 40 of the extremity or the indicator part 36 of the hand 28. Likewise when the "before or after" hand points toward the numeral 12, the pictorial representaitve 46 suggestive of the whole, will be framed within the opening 40 of the indicator part 36.

The following teaching technique may be advantageously followed in utilizing the time-telling aid of the present invention: First, the child is taught the relatively simple phrase "The time is." After grasping this, the child is taught to associate the "after" side or segment 16 of the clock with the identifying indicia 20, 22 thereon. Also the child is taught to associate the "before" segment or side 18 of the clock face 12 with the suggestive pictorial representation 26 of the identifying member 24.

Once the above is reduced to memory, the child is taught that the elongated member 32 is the "o'clock" hand, the symbols 34 and the shape of member 32 serving

::::

to firmly implant this in the mind of the child. The child is then informed that each number is an "o'clock" and that the "o'clock" is the numeral nearest the "o'clock" hand. The child is then schooled to repeat the phrase "The time is" followed by a designation of the "o'clock" as determined by the position of the o'clock hand 32.

When the child has completely grasped this simplified approach to the telling of the hours, the next step is to teach the child to associate the "before" or "after" hand 28 with the appropriate segments of the clock face 12. This is readily accomplished by the correlation of the pictorial representations on the member 28 to the corresponding pictorial representations or symbols of the segments 16 and 18. Specifically, as the "before" or "after" hand traverses the segment 16 the identifying member 20' with the symbols 22' is uppermost and readily suggests to the child "The time is after." Similarly, when the "before" or "after" hand traverses the segment 18 of the clock face 12, the identifying member 24' and the symbol 26' is uppermost and easily related to the corresponding identifying member 24 and symbols 26 provided on the left hand or "before" segment of the clock face. The child is then capable of ascertaining whether or not "The time is" "before" or "after" the "o'clock." At this point the child is then taught to say "The time is after the o'clock." In the illustrative example, the "before" or "after" hand overlies the segment 16 and the symbols readily seen are suggestive of "after." The o'clock hand is pointed to the numeral 5, and accordingly the child will say "The time is after 5 o'clock." After the child has practiced "before" or "after" sufficiently and is capable of correlating the term "before" or "after," as suggested by the pictorial representations on the segments 16, 18 and on the "before" or "after" hand 28, the child is capable of following the following simplified technique in ascertaining the time: First, he repeats the simple phrase "The time is." Thereupon the child pictorially relates the indicia or symbols on the "before" or "after" hand 28 which is uppermost and overlying the appropriate clock segment and says either "before" or "after." Then the child notes in which direction the o'clock hand is pointed and says "5 o'clock." The child will then repeat the phrase "The time is—after—5 o'clock."

If the child is capable of ascertaining numerals from 1 to 29, which is entirely commonplace even before entering formalized training, the child is taught to employ the unit or minute markers 42 with the appropriate numerals in ascertaining the exact time in minutes "before" or "after." When the "before" or "after" hand 28 is over the "after" segment 16 the child is taught to recognize the minute numeral nearest the pointer 38 on the "before" or "after" hand and can then state the numerical designation of the time in minutes prior to the word "after" in the appropriate phrase. Similarly, when the "before" or "after" hand 28 is over the segment 18, the child is taught to recognize the minute numeral nearest the pointer 38 and can then state the numerical designation of the time in minutes immediately preceding the word "before" in the simple sentence which he has learned to repeat in the appropriate instance.

After completely mastering this technique, the child can be taught to differentiate the hour from half past the hour. This is readily accomplished by the provision of the indicator part 36 on the free extremity of the "before" or "after" member 28 which is arranged to frame the pictorial representation 46 suggestive of a "whole" or the "hour" when the "before" or "after" member points to the numeral 12. A similar representation 48 is provided contiguous to the numeral 6 which pictorially relates "one half" or "half" past the "o'clock" in the child's mind.

In substantially the aforesaid manner, it is possible to teach a child of preschool age to tell time with a reasonable amount of accuracy and in a manner requiring little mental agility since the visual aid is particularly designed to exploit the meager knowledge of the child, which usually extends to the ability to count and to associate a word or a phrase with a suggestive pictorial representation.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

What I claim is:

1. In a visual time telling aid, a member having a clock face thereon provided with numerals from 1 to 12 indicative of the hours, a dividing line extending across said clock face from the numeral 12 to the numeral 6 and subdividing said clock face into a right hand segment separated from a left hand segment by said dividing line, identifying means on said right hand segment indicating the time to be "after," identifying means on said left hand segment indicating the time to be "before," an elongated "before or after" member in the form of a hand pivoted adjacent one end for movement about said clock face to traverse said segments, identifying means on said elongated member similar to the identifying means on said right hand segment and properly discernable only when said elongated member traverses said right hand segment, and identifying means on said elongated member similar to the identifying means on said left hand segment and properly discernable only when said elongated member traverses said left hand segment.

2. In a visual time telling aid, a member having a clock face thereon provided with numerals from 1 to 12 indicative of the hours, a dividing line extending across said clock face from the numeral 12 to the numeral 6 and subdividing said clock face into a right hand segment separated from a left hand segment by said dividing line, identifying means on said right hand segment indicating the time to be "after," identifying means on said left hand segment indicating the time to be "before," an elongated "before or after" member in the form of a hand pivoted adjacent one end for movement about said clock face to traverse said segments, identifying means on said elongated member similar to the identifying means on said right hand segment and properly discernable only when said elongated member traverses said right hand segment, and a member shorter in length than said "before or after" member and in the form of a hand, said member being pivoted adjacent one end for movement about said clock face and including identifying means suggestive of the phrase "o'clock."

3. In a visual time telling aid, a member having a clock face thereon provided with numerals from 1 to 12 indicative of the hours, a dividing line extending across said clock face from the numeral 12 to the numeral 6 and subdividing said clock face into a right hand segment separated from a left hand segment by said dividing line, identifying means on said right hand segment indicating the time to be "after," identifying means on said left hand segment indicating the time to be "before," an elongated "before or after" member in the form of a hand pivoted adjacent one end for movement about said clock face to traverse said segments, identifying means on said elongated member similar to the identifying means on said right hand segment and properly discernable only when said elongated member traverses said right hand segment, identifying means on said elongated member similar to the identifying means on said left hand segment and properly discernable only when said elongated member traverses said left hand segment, a symbol on said clock face contiguous to the numeral 12 suggestive of "the hour," another symbol on said clock face contiguous to the numeral 6 suggestive of "half of the hour," and an indicator part on the free extremity of said "before or after" member for successively framing said symbols.

4. In a visual time telling aid, a member having a clock face thereon provided with numerals from 1 to 12 indicative of the hours, a dividing line extending across said clock face from the numeral 12 to the numeral 6 and subdividing said clock face into a right hand segment separated from a left hand segment by said dividing line, identifying means on said right hand segment indicating the time to be "after," identifying means on said left hand segment indicating the time to be "before," an elongated "before or after" member in the form of a hand pivoted adjacent one end for movement about said clock face to traverse said segments, identifying means on said elongated member similar to the identifying means on said right hand segment and properly discernable only when said elongated member traverses said right hand segment, identifying means on said elongated member similar to the identifying means on said left hand segment and properly discernable only when said elongated member traverses said left hand segment, a first group of markers arranged at spaced intervals of said right hand segment of said clock face, said first group of markers being successively provided with numbers from 1 to 29 reading clockwise from the numerals 12 to 6 on said clock face, and a second group of markers arranged at spaced intervals of said left hand segment of said clock face, said second group of markers being successively provided with numerals from 1 to 29 reading counterclockwise from the numerals 12 to 6 on said clock face.

5. In a visual time telling aid, a member having a clock face thereon provided with numerals from 1 to 12 indicative of the hours, a dividing line extending across said clock face from the numeral 12 to the numeral 6 and subdividing said clock face into a right hand segment separated from a left hand segment by said dividing line, identifying means on said right hand segment indicating the time to be "after," identifying means on said left hand segment indicating the time to be "before," an elongated "before or after" member in the form of a hand pivoted adjacent one end for movement about said clock face to traverse said segments, identifying means on said elongated member similar to the identifying means on said right hand segment and properly discernable only when said elongated member traverses said right hand segment, a member shorter in length than said "before or after" member and in the form of a hand, said member being pivoted adjacent one end for movement about said clock face and including identifying means suggestive of the phrase "o'clock," a symbol on said clock face contiguous to the numeral 12 suggestive of "the hour," another symbol on said clock face contiguous to the numeral 6 suggestive of "half of the hour," an indicator part on the free extermity of said "before or after" member for successively framing said symbols, a first group of markers arranged at spaced intervals of said right hand segment of said clock face, said first group of markers being successively provided with numbers from 1 to 29 reading clockwise from the numerals 12 to 6 on said clock face, and a second group of markers arranged at spaced intervals of said left hand segment of said clock face, said second group of markers being successively provided with numerals from 1 to 29 reading counterclockwise from the numerals 12 to 6 on said clock face.

References Cited in the file of this patent

UNITED STATES PATENTS

| Number | Name | Date |
| --- | --- | --- |
| 696,690 | Murray | Apr. 1, 1902 |
| 2,172,450 | Pitcher | Sept. 12, 1939 |

FOREIGN PATENTS

| Number | Country | Date |
| --- | --- | --- |
| 17,281 | Great Britain | 1915 |